United States Patent [19]

Shimizu et al.

[11] 3,814,406

[45] June 4, 1974

[54] ROTARY MELTING FURNACE

[75] Inventors: Katsumi Shimizu, Takehara; Mamoru Kimura, Ohmuta, both of Japan

[73] Assignee: Mitsui Mining & Smelting Co., Ltd., Chuo-ku, Tokyo, Japan

[22] Filed: June 20, 1973

[21] Appl. No.: 371,831

[30] Foreign Application Priority Data

July 27, 1972 Japan ................................ 47-74605

[52] U.S. Cl. ................. 266/36 H, 266/18, 432/114, 432/117, 432/118

[51] Int. Cl. ........................................... C22b 19/30

[58] Field of Search ............. 266/24, 15, 16, 18, 35, 266/36 H, 37; 432/103, 108, 112–115, 117, 118

[56] References Cited

UNITED STATES PATENTS

| | | | |
|---|---|---|---|
| 596,533 | 1/1898 | Naef | 432/117 |
| 1,751,736 | 3/1930 | Hornsey | 432/115 |
| 3,228,670 | 1/1966 | Moklebust | 266/18 X |
| 3,542,350 | 11/1967 | Sherwood | 266/18 X |
| 2,622,977 | 12/1952 | Kalling et al | 266/36 H |

*Primary Examiner*—Gerald A. Dost

*Attorney, Agent, or Firm*—Woodhams, Blanchard and Flynn

[57] ABSTRACT

A rotary melting furnace for separating and recovering metallic zinc from metallic zinc bearing material, which comprises a cylindrical furnace body, a combustion cylinder for heating said furnace body, a burner, a sealing case, a chute for charging the raw material into said sealing case and a pipe for discharging final residue.

7 Claims, 5 Drawing Figures

ROTARY MELTING FURNACE

BACKGROUND OF THE INVENTION a. Field of the Invention

The present invention relates to a rotary melting furnace for separating and recovering metallic zinc in molten state from metallic zinc bearing material such as zinc bearing scraps, zinc ash, zinc dross or zinc blue powder.

b. Description of the Prior Art

As the rotary furnace for recovering metallic zinc from zinc scraps by heating said scraps and melting metallic zinc contained therein, there are known rotary furnaces having a flue inside the wall of batch-type furnace, as disclosed in the Japanese Pat. Publication No. 426/1970 (Patent applicant: Mitsui Kinzoku Kogyo K.K.). Operation of this batch-type rotary furnace is generally performed through the process comprising, in order, charging the raw material into said rotary furnace, closing the charging hole tightly, setting off the burner for combustion, applying 2 – 3 hours' heating in case of the volume of the raw material charged is about 1 – 1.5 t, thereafter suspending the rotation of furnace and the combustion of burner so as to make the molten zinc flow out throw the tapping hole to be recovered and discharging the final residue from the furnace by means of a raking bar and the like. Therefore, the period for suspension of operation of the rotary furnace is pretty long and the temperature of furnace during said period for suspension of operation gets extremely lowered resulting in a considerable heat loss. Moreover, from the view point of productivity, the working efficiency is very unsatisfactory.

SUMMARY OF THE INVENTION

The present invention is to provide a rotary melting furnace capable of operation at a highly improved working efficiency without impairing the advantages of the aforesaid rotary furnace, such as the retentivity of high thermal efficiency at the time of operation and the retentivity of a satisfactory airtightness inside the furnace, and particularly an indirect heater-type rotary melting furnace capable of continuous operation.

In the present invention, a dexterous contrivance is applied particularly to one end of the rotary furnace, i.e., the side for charging the raw material, and the other end of same, i.e, the side for discharging the final residue. By virtue of this contrivance, it is rendered possible to charge the raw material and discharge the final residue continuously. Drawing of metallic zinc melt produced within the rotary furnace from said furnace is usually performed intermittently, but it is also possible to draw it continuously.

In other words, the first object of the present invention is to provide a rotary melting furnace equipped with a novel means for discharging the final residue devised to discharge almost continuously the final residue arising in said furnace to the outside of the furnace by utilizing the rotation thereof through improvement of the structure of the final residue discharging side of the furnace.

The second object of the present invention is to provide a rotary melting furnace equipped with a novel means for charging the raw material continuously through improvement of the structure of the raw material charging side of said furnace so as to render it possible to introduce the raw material continuously into said rotary melting furnace in concert with the aforesaid means for discharging the final residue.

The third object of the present invention is to provide a rotary melting furnace equipped with a novel sealing mechanism so as to render it possible to operate said furnace under the condition that the inside of the rotary melting furnace be cut off the open air.

The foregoing novel means and mechanism according to the present invention may be severally installed on any rotary melting furnace known heretofore. However, a rotary melting furnace illustrative of the optimum embodiment of the present invention is as follows:

A rotary melting furnace comprising:

a cylindrical furnace body having a round opening in the central part of the furnace end wall (a) on the raw material charging side and tapping holes in said wall (a) and/or other parts of said body; a combustion cylinder for heating said furnace body which has a diameter smaller than that of said opening, one end of said combustion cylinder projecting to a position outside said furnace end wall (a) while the other end of same being held in the center of the furnace end wall (b) on the final residue discharging side opposite to said furnace end wall (a);

a burner inserted in said combustion cylinder through its end projecting to the outside of the furnace end wall (a);

at least one screw blade inserted in the annular aperture formed between said opening and the side wall of said combustion cylinder and fixed on the wall of said opening, the edge of said screw blade being held slightly apart from the surface of the side wall of said combustion cylinder; a sealing case for inducing the raw material to said opening of said furnace end wall (a) and also enclosing the portion of said combustion cylinder adjacent to said furnace end wall (a) excluding the portion wherein said burner is inserted, said opening being rotatably connected with the opening provided for said sealing case by means of a metal seal;

a chute for charging the raw material by dropping it into said sealing case; and a pipe for discharging the final residue which is installed penetrating said furnace end wall (b) aslant from the outside edge of said furnace end wall (b) toward a position adjacent to the side wall of said combustion cylinder within the furnace body, the opening of said pipe projecting into the furnace body being connected with a scoop funnel fixed on a refractory ring formed to be contiguous to both the side wall end and said furnace end wall (b).

Hereunder will be given a further elucidation of the present invention with reference to the appended drawings.

BRIEF DESCRIPTION OF THE DRAWINGS

In the appended drawings.

Numeral references in each drawing denote the names of parts as summarized in the following:

| | |
|---|---|
| 1 . . . furnace body | 2 . . . bin for raw material to be charged |
| 3 . . . combustion cylinder | 4 . . . dust-collecting hood |
| 4′ . . . chute | 5 . . . water-cooled screw-driven conveyor |
| 6 . . . bucket elevator | 7 . . . bin for discharged residue |
| 8 . . . burner | 9 . . . rotary roller |
| 10 . . . gear | 11 . . . rotary feeder |
| 12 . . . torque motor for detecting blocking raw material | 13 . . . exhaust gas flue |
| 14 . . . cut damper | 15 . . . pipe for discharging final residue |
| 16 . . . scoop funnel | 17 . . . furnace wall |
| 18 . . . flue | 19 . . . tapping hole |
| 20 . . . chute for charging raw material | 20′ . . . sealing case |
| 21 . . . metal seal | 22,22′22″ . . . screw blade (trunnion screw) |
| 23 . . . blade for raking-in of fine grains | 24 . . . metallic zinc melt |
| 25 . . . ashes | 26 . . . fixing pen of damper |
| 27 . . . cam | 28 . . . spring |
| 29 . . . spherical chair lining | 30 . . . movable blade |
| 31 . . . agitating blade made of refractory material | 32 . . . seal |

DETAILED DESCRIPTION OF THE INVENTION

Figure 1:
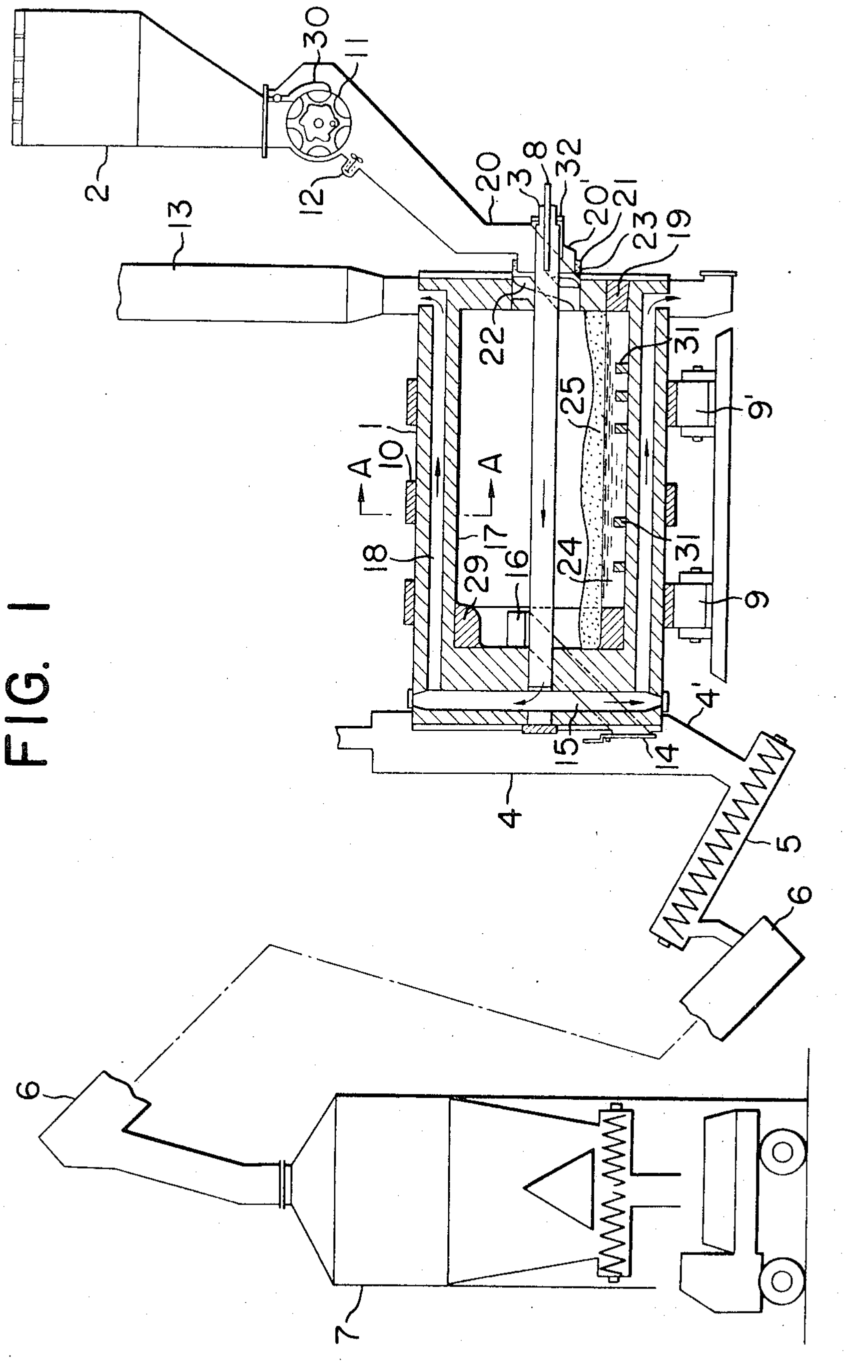
FIG. 1 is a diagrammatic representation of the arrangement of the rotary melting furnace and its accessory equipment illustrative of an embodiment of the present invention.

Referring to FIG. 1 which is a diagrammatic representation of the arrangement of the rotary melting furnace and its accessory equipment illustrative of an embodiment of the present invention, one end of the furnace body constituting the raw material charging side is connected with the raw material charging chute 20 so as to retain the airtightness of the inside of furnace together with the sealing case 20′, and, in this joint, the screw blades 22, 22′, 22″ (trunnion screw) to rake continuously into the furnace the raw material being dropped through said chute to be charged into said sealing case 20′ are inserted and fixed onto the furnace body. The other end of the furnace body constituting the final residue discharging side is provided with the scoop funnel 16 fixed within the furnace. The final residue discharging pipe 15 is fixed to this scoop funnel 16 and its end opening is provided with the cut damper 14 devised to block said opening intermittently. The chute 20 on the raw material discharging side is connected with the bin 2 for the raw material to be charged through the rotary feeder 11. The final residue discharging side is provided with the hood 4 covering the end of the furnace body and the final residue discharging chute 4′, and is connected with one end of the bucket elevator 6 through the water-cooled screw-driven conveyor 5. The other end or the final residue discharging end of said bucket elevator 6 is connected with the bin 7 for discharged final residue.

Figure 2:
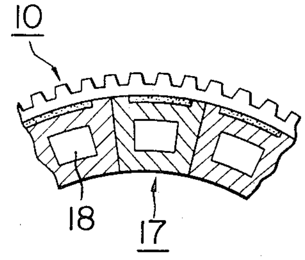
FIG. 2 is a cross-sectional view of a part of the furnace wall of the rotary furnace of FIG. 1 as taken along the direction of arrow A—A therein.

The inside of the furnace wall 17 of the furnace body 1 of the rotary melting furnace according to the present invention, said furnace wall consisting of refractory adiabatic bricks or furnace material, is provided with the flue 18 which surrounds the whole inside of the furnace wall and opens into the air. The combustion exhaust gas coming from the combustion cylinder 3 for heating said furnace body, said cylinder being made of heat resisting steel or stainless steel, passes the flue 18 along the direction of arrow shown in FIG. 1 to circulate inside the furnace wall and is thereafter discharged through the exhaust gas discharging chimney 13. In this connection, it is advisable to discharge said exhaust gas from the chimney 13 into the air upon passing it through a dust collector such as bag filter and the like. The furnace wall of the furnace body 1, when cut along the line A—A in FIG. 1, presents the cross-sectional view of its structure as shown in FIG. 2, and a number of flues 18 are provided within said furnace wall. These flues 18 within the furnace wall may be interconnected by means of annular flue, or may be devised to run radially from the furnace end. By virtue of such structure, the combustion heat of the gas or liquid fuel, such as carbon monoxide gas, city gas, liquefied petroleum gas, heavy oil and other fuel oils, burnt within the combustion cylinder of the furnace by means of the burner 8 upon charging therein together with air can be utilized very efficiently in holding a desired temperature within the furnace.

In the present invention, the end of the chute 20 provided with the rotary feeder 11 and fixed with an appropriate supporting means is connected with the sealing case 20′. And the trunnion screws 22, 22′, 22″ fixed on the central part of the furnace end wall on the raw material charging side of the furnace body 1 are rotated together with the furnace body 1 en bloc. The furnace body 1 supported by the rotary roller 9 is rotated by means of a rotary driving machine connected with the rotary gear 10 thereof.

Figure 3:
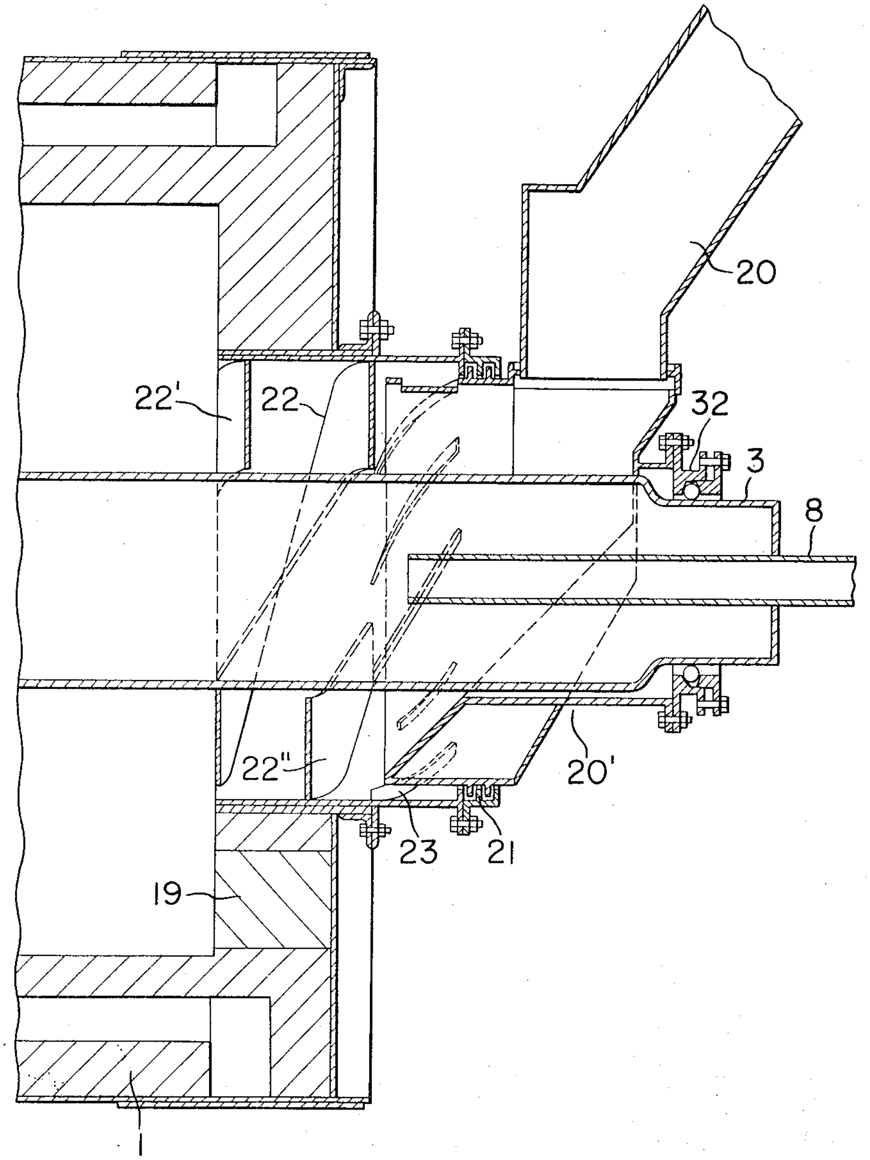
FIG. 3 is a cross-sectional view - on an enlarged scale - of a part of the sealing case.

To further elucidate the mechanism for connecting the chute 20 with the furnace body 1, as is shown in FIG. 3, the sealing case 20′ having such a structure as will not impede the rotation of the furnace body 1 but will prevent air from entering the furnace body and induce the raw material descending from the chute toward the trunnion screw is installed between the chute and the furnace body. The outside diameter of this sealing case 20′ is sufficiently greater than that of the combustion cylinder 3, and is almost equal to the bore of the round opening provided in the center of the furnace end wall on the raw material charging side of the furnace body 1 (this wall is designated as the furnace end wall (a) for the purpose of distinguishing it from the furnace end wall on the final residue discharging side) as shown in FIG. 3. And, as is shown in FIG. 3, the opening of one end of the sealing case 20′ is connected with the end wall of the combustion cylinder 3 adjacent to the burner 8 so as to prevent air from entering by virtue of the fixed seal 32. The joint of the opening of the sealing case 20′ confronting the furnace end wall (a) and the opening of the furnace body 1 is so constructed as to enclose the trunnion screw in said furnace end wall, to prevent air from entering the furnace body 1 and not to hamper the rotation of the furnace body 1, as shown in FIG. 3. That is, the jagged ring provided for the opening of said sealing case and the jagged ring provided on the end of the supported cylinder projecting it from the opening of said furnace end wall (a) are engaged with each other to form the metal seal 21, whereby both are interconnected. In order to rake into the furnace body 1 the raw material to be charged by dropping through the chute 20 and the sealing case 20', said furnace end wall (a) is provided with a hole or an opening having a diameter a fairly greater than the outside diameter of the combustion cylinder, and, in the annular aperture formed between this hole or opening and said combustion cylinder, there is inserted and fixed the trunnion screw. One end of the combustion cylinder 3 may either be clamped on the tip of the blade of said trunnion screw by means of bolt and nut so as to make it rotate in the same way as the furnace body 1 or be fixed on the fixed seal 32 alone so as to make it unrotatable, while the other end of same is inserted in the final residue discharging side wall to be supported thereby.

The shape of the screw blades 22, 22' and 22'' for raking the raw material into the furnace is not necessarily limited to such one as shown in FIG. 3; it can be of various shapes convenient for raking and moving the raw material being charged by dropping through the chute 20 and the sealing case 20' toward the inside of the furnace body by virtue of the rotation of said furnace body, and it also will do to fasten two to several propeller-shaped blades onto the wall of the opening of the furnace body 1. And, it is advisable to install one to several blades for raking-in of fine grains at a place adjacent to the metal seal 21 inasmuch as the escape of fine powdery raw material to the outside of furnace through the metal seal 21 becomes nil thereby. The raw material such as zinc scraps thus charged into the furnace is separated into metallic zinc melt 24 and final residue 25 and repeats practically the same movement as that of the raw material charged into an ordinary rotary kiln, namely, ascending in the state of a melt having the residue floated thereon along the furnace wall in the direction of rotation of the furnace body and then dropping by dint of its own weight. The final residue inside the furnace body is pushed by the raw material being charged successively toward the furnace end wall on the final residue discharging side (this wall is designated as the furnace end wall (b) for the purpose of distinguishing it from the furnace end wall (a)).

In the rotary melting furnace under the present invention, the scoop funnel 16 for receiving the final residue - which residue is to ascend and drop with the rotation of the furnace as set forth above - in the course of its dropping is fixed on the furnace wall on the final residue discharging side so as to receive the final residue little by little with every rotation of the furnace body. This scoop funnel 16 is disposed at a position away from the inner surface of the side wall of furnace lest it should be dipped in the melt at the time of rotation of the furnace, and the final residue discharging pipe 15 with its one end projecting to the outside of the furnace penetrates the furnace wall to be connected with said funnel, whereby the final residue received as above is discharged to the outside of the furnace with every rotation of the furnace.

As to the structure of the scoop funnel 16, one side of said scoop funnel is formed with the spherical chair lining 29 fixed by annularly heaping up the corner of the inside wall on the final residue discharging side of the furnace body 1 (the joint of the furnace end wall (b) and the side wall) so as to prevent the melt from entering the scoop funnel 16, another side of same is formed with the surface of the furnace end wall (b), and the remaining two sides are formed with heat-resisting steel plate such as stainless steel plate meeting practically at right angles with the foregoing two sides, thereby forming a square-shaped scoop funnel contiguous to the surrounding walls of furnace having its diameter reduced. And, by welding the upper end of the pipe 15 made of heat-resisting steel which penetrates aslant the furnace end wall (b) from its outside edge onto the lower end of heat-resisting steel plate of said square-shaped scoop funnel, the inside and the outside of the furnace are interconnected and the final residue discharging passage is formed. The angle of inclination for fixing the final residue discharge pipe 15 is desirable to be large, and application of about 55° is usually suitable. The appropriate bore of said pipe 15 is about 15 cm when the maximum volume of the raw material is 10 cm cube. By virtue of the final residue discharge mechanism as above, the final residue is elevated fairly high along the spherical chair lining 29 and the furnace wall without drawing the metallic zinc melt therein because of the rotary motion at the time of operating the rotary melting furnace and is received in said scoop funnel 16. The raw material to be treated with the rotary melting furnace under the present invention contains a considerable quantity of air, and there are instances where it also contains a little water adsorbed thereto. As a result, the internal pressure of furnace on the occation of solid-liquid separation of the raw material within the furnace comes to be a considerably high possitive pressure, and, according to circumstances, it is necessary to exhaust the gas generated in the furnace to the outside of the furnace little by little. In the present invention, however, by virtue of the final residue discharge mechanism as set forth above, the gas arising inside the furnace is properly exhausted along with the final residue being discharged through the pipe 15, so that there is no necessity for providing any particular means for discharging the gas arising inside the furnace. Nevertheless, in case of leaving this final residue discharge pipe 15 open to the air, there is a fear of the air being drawn in due to reactions at the time of discharging the final residue or fluctuations of the internal pressure of furnace, entailing the danger of inviting explosions within the furnace.

The present invention is to provide a rotary melting furnace supplemented with a means for preventing the occurrence of such intrafurnace explosions. As set forth above, it is devised to open the final residue discharge pipe 15 only on the occasion of discharging the final residue by providing the cut damper 14.

Figure 4:
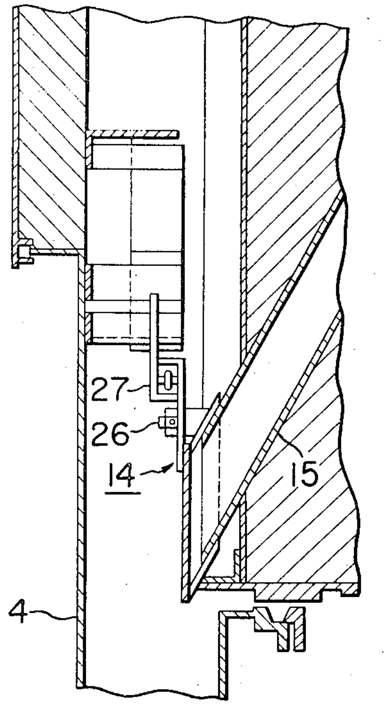
FIG. 4 is a cross-sectional side view of the cut damper to be installed on the furnace wall on the final residue discharging side of the rotary melting furnace under the present invention. And, FIG. 5 is a diagram illustrative of the working mechanism of said cut damper.
Figure 5:
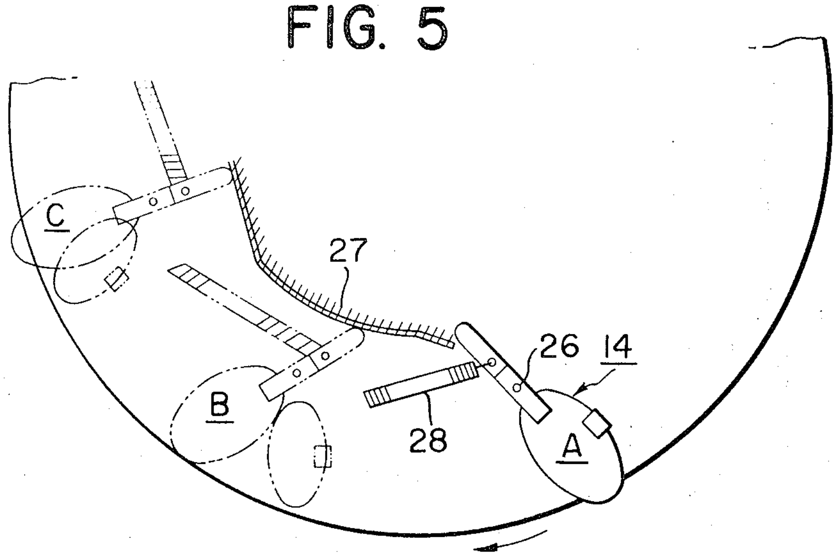

The particulars of the cut damper 14 are as illustrated in FIG. 4 showing the cross-sectional view thereof on an enlarged scale and FIG. 5 diagrammatically showing the working mechanism thereof. In these drawings, the spoonlike cut damper 14 devised to closely contact with the end opening of the final residue discharge pipe 15 to block it is supported by the fixing pen of damper 26 so as to be capable of inclinatory movement. The shank portion of the cut damper 14 comes in contact with the cam 27 fixed on the hood 4 with the rotation of the furnace in the direction of arrow and is moved to be in the states A-B-C along said cam 27. In this way, said cut damper 14 works to open the opening of the pipe 15 when said opening comes to be located right under it (the position B) and block said opening when the position of said opening has begun to ascend. In the cases other than the foregoing, said damper 14 is held in the state A. The strip-shaped cam 27 bent toward the outer surface of the furnace end wall (b) as shown in FIG. 5 is fixed on a prescribed place of the inner wall of the hood 4 as shown in FIG. 4. The spring 28 is installed at a proper place of the shank of the cut damper 14 so as to be capable of immediately returning said damper to the state of blocking (the state A) when disengaged from the cam 27. By virtue of this cam mechanism, the end of the pipe 15 is opened only when said pipe turns to a prescribed position, the final residue within the furnace is discharged to the outside of the furnace and the gas within the furnace is also exhausted, while in the case where said pipe 15 turns to any position other than said prescribed position, the end of said pipe is held in the state of being blocked. On the occasion of discharging the final residue, the provision of a suction device such as dust collector connected with upper part of the hood 4 serves to prevent the generation of dusts almost completely.

In the rotary melting furnace under the present invention, metallic zinc separated by melting the raw material within the furnace may be taken out periodically through the tapping hole 19 (this tapping hole is not required to be located as shown in the appended drawing; it may be appropriately disposed on the furnace end wall (b) and/or furnace side-wall.). It also will do to dispose a tapping hole with diameter of about 20 – 25 mm so as to permit the melt to flow over the outside of furnace at the stage of the melt having been produced in excess of a fixed depth of layer of melt within the furnace and let the melt flow over only when said tapping hole has come downward with the rotation of the furnace. In case of recovering metallic zinc by making the melt overflow as above, it is desirable to install a trough having semicircular cross section right under the tapping hole of the rotary melting furnace and keep it heated. This trough may be further provided with a weir or trough for removing the final residue; by so doing, the final residue can be removed even if it is somewhat involved in the melt at the time of overflow. The tapping hole 19 or tapping hole for overflow may be provided for not only the raw material charging side of the furnace body 1 but also the final residue discharging side of same; by so doing, tapping of zinc melt can be optionally performed on either one or both of these sides.

In the present invention, the raw material charging chute 20 may be directly connected with the raw material bin 2 to thereby feed the raw material successively, but in case of disposing of a raw material comprising big lumps or a raw material having irregular grain size, it is desirable to install a net or a sieve for removing big lumps above the raw material bin 2. It is more preferable to provide the rotary feeder 11 containing steel balls therein for the lower end of the bin 2 to thereby periodically feeding the chute 20 with a fixed quantity of the raw material coming from said bin 2, and install the movable blade 20 being constantly pressed down by a spring so as to open only when a big lump is seized therein on the side of said feeder 11. Further, it is desirable to install the torque motor 12 for detecting blocking raw material, as shown in the appended drawing, on a proper spot of the passage for charging the raw material between direct under the rotary feeder 11 and the chute 20 to detect eventual blocking of said passage. By so doing, it is possible to feed a fixed quantity of raw material at a fixed speed by setting the rotation speed of the rotary feeder 11 at a desired value, and also a stable operation of the rotary melting furnace can be expected as it is possible to instantly detect eventual blocking of the chute 20. Moreover, in the present invention, the sealing case 20' disposed at the joint of the casing for the trunnion screw fixed on the furnace body 1 and the chute 20 is so attached as to be capable of rotation and holding a considerable airtightness by means of the aforesaid metal seal 21 and is so designed as to prevent the impediment of rotation of the furnace body attributable to involvement of fine raw materials and to be proof against change of size due to thermal expansion. As for the seal 32 to be applied to the aperture at the joint of the combustion cylinder 3 and the sealing case 20', insertion of an ordinary asbesto packing will suffice to effect a satisfactory sealing.

The raw material to be treated within the rotary melting furnace under the present invention may include particularly hygroscopic substances, such as ammonium chloride, and there are instances where the occurrence of intrafurnace explosion is unavoidable. Accordingly, it is advisable to provide in the vicinity of the rotary feeder a lid designed to open merely on the occasion of explosion. This lid is desirable to be constructed and work in such a fashion as follows: a hole is bored in the side wall in the vicinity of the rotary feeder; a pipe is fastened in said hole; an appropriate guide rail is perpendicularly fixed around the hole; the lid is laid on the end of said guide rail and usually closes the hole by virtue of its own weight; on the occasion of explosion, the lid is to be blown upward to open the hole.

In case of continuously operating the rotary melting furnace of the present invention as above by charging the raw material continuously, the inner temperature of the raw material charging side of the furnace inevitably becomes somewhat lower than the inner temperature of the final residue discharging side of same, and there are instances where a radical increase of the quantity of the raw material being charged causes quenching of the interior of the raw material charging side resulting in solidification of zinc melt. Such being the case, it is desirable to charge the raw material and discharge the final residue little by little to see that the quantity of the final residue being discharged practically agrees with the quantity of the raw material being charged. However, even if the quantity of the raw material being discharged is increased by fairly a large margin, by virtue of the provision of one to several agitating blades made of refractory material installed on fastened on the inner wall of the rotary melting furnace at such an angle as is convenient for sending the raw material to the final residue discharging side, the row material charged at a stroke is not allowed to stay on the molten zine, but is agitated and conveyed toward the final residue discharging side, whereby metallic zinc can be separated and recovered under a stable intrafurnace condition. Besides, even if the foregoing agitating blades made of refractory material are not provided on the inner wall of furnace, with the lapse of a certain period of time following the state of operation of the rotary melting furnace, the final residue adheres to the inner wall surface of the furnace to form the so-called rock oxide and the configuration of the inner furnace wall becomes oval and convenient for expediting the movement of the raw material charged toward the center of the furnace as well as agitation of said raw material.

DESCRIPTION OF THE PREFERRED EMBODIMENTS

Hereunder given are examples wherein a variety of metallic zinc bearing raw materials were treated to recover zinc therefrom by employing the rotary melting furnace and accessory equipment thereof under the present invention such as shown in FIG. 1.

capacity of rotary melting furnace employed: 3.558 $m^3$
rotation speed: 3.1 r.p.m.
fuel employed: coke-oven gas (calorific value: 5000 Kcal/$Nm^3$)
intrafurnace temperature of raw material charging side: 420 – 450°C
intrasurface temperature of final residue discharging side: 550 – 600°C
raw material charging rate: 1.5 ton/hr
diameter of final residue discharge pipe: 139.8 $\Phi^{O.D.}\times 4.5^{t}$mm (made of heatproof, anticorrosive stainless steel) diameter of combustion cylinder: 380 $^{O.D.}\times 25^{t}$ mm intervals for intermittent metal tapping: 3 hrs.

Under the foregoing conditions for operation, the following raw materials were treated. In this connection, the final residue discharge pipe was cleaned with a rotary brush made of steel wire at the rate of once per 8 hours' operation so as to expose the surface of stainless steel.

| Raw material to be treated | Metallic Zn content | Grade of recovered zinc slab as Zn | Yield of Zn slab | Quantity of raw material treated t/day |
|---|---|---|---|---|
| zinc ash (skimming) | 45% | 99.4% | 80% | 30 |
| zinc dust (blue powder) | 82% | 99.4% | 85% | 28 |
| (in case of batch-type furnace) zinc ash (skimming) | 45% | 99.4% | 76% | 12 |

As is clear from the foregoing, the raw material disposability of the rotary melting furnace under the present invention has been improved to be 3 times as high as that of the conventional batch-type rotary furnace having a capacity equivalent to it. Besides, while the batch-type rotary furnace usually requires 6 manpower/day for the operation of one unit thereof, the present rotary melting furnace can reduce it to 3 manpower/day, and even in case of simultaneous operation of two units thereof, 3 – 4 manpower/day will suffice subject to mechanization of the process of casting metallic zinc melt. Further, while all the works for operating the batch-type rotary furnace have always depended on manpower, in the case of the present rotary melting furnace, the works for its operation scarcely need manpower save for the inspection work, the generation of dust and the like decreases remarkably, and the working environment is must improved. The decrease in the amount of consumption of fuel is also an effect of the present invention. The amount of fuel (5,000 Kcal/$Nm^3$ coke-oven gas) consumed per ton of raw material treated was about 48 $Nm^3$ in the case of the present rotary melting furnace, while in the case of the conventional batch-type rotary furnace, it was about 100 $Nm^3$.

What is claimed is:

1. In the rotary melting furnace comprising a cylindrical furnace body, a combustion cylinder for heating said furnace body inserted from the central part of the furnace end wall (a) on the raw material charging side constituting one end of said furnace body toward the central part of the furnace end wall (b) on the final residue discharging side constituting the other end of said furnace body and a burner inserted in said combustion cylinder, an improvement wherein said rotary melting furnace is to be provided with a means for discharging final residue comprising a pipe for discharging final residue which is installed penetrating said furnace end wall (b) aslant from the outside edge of said furnace end wall (b) toward a position adjacent to the side wall of said combustion cylinder within the furnace body, and a scoop funnel composed of a refractory ring formed to be contiguous to both the transverse side wall end and said furnace end wall (b) and a part of said furnace end wall (b), said scoop funnel being connected with the opening of said pipe projecting into the furnace body.

2. A rotary melting furnace according to claim 1, which is provided with a means for continuously charging the raw material comprising:

a cylindrical furnace body having a round opening in the central part of the furnace end wall (a) on the raw material charging side and tapping holes in said wall (a) and/or other parts of said furnace body, said furnace body being supported by a means for rotation;

a combustion cylinder for heating said furnace body which is inserted in said furnace body the direction of the central axis of the furnace, one end of said combustion cylinder projecting to a position outside said furnace end wall (a) while the other end of same being held in the center of the furnace end wall (b) on the final residue discharging side opposite to said furnace end wall (a); and at least one screw blade inserted in the annular aperture formed between said opening and the side wall of said combustion cylinder and fixed on the wall of said opening, the edge of said screw blade being held slightly apart from the surface of the side wall of said combustion cylinder.

3. A rotary melting furnace according to claim 2, which is provided with a means for inducing the raw material to said raw material charging means while shutting off the air, said raw material induction means comprising:

a sealing case for inducing the raw material to said opening of said furnace end wall (a) and also enclosing the portion of said combustion cylinder adjacent to said furnace end wall (a) except for the portion wherein said burner is inserted, said opening being rotatably connected with the opening provided for said sealing case by means of a seal; and a chute for dropping and charging the raw material into said sealing case.

4. A rotary melting furnace according to claim 3, wherein a rotary feeder is installed above said chute, the upper part of said feeder being connected with the end opening of a bin for raw material.

5. A rotary melting furnace according to claim 3, wherein said seal is formed by engaging a jagged ring provided for the opening of said sealing case confronting the furnace end wall (a) with a jagged ring provided for the round opening of said furnace end wall (a).

6. A rotary melting furnace according to claim 1, wherein the opening of the pipe for discharging final residue disposed outside said furnace end wall (b) is provided with a cut damper.

7. A rotary melting furnace according to claim 1, wherein the inner wall of said furnace body is provided with at least one agitating blade made of refractory material for the purpose of agitating the raw material charged and moving said raw material toward said furnace end wall (b).

* * * * *